(12) United States Patent
Allen et al.

(10) Patent No.: US 6,278,067 B1
(45) Date of Patent: Aug. 21, 2001

(54) WEIGHT SIMULATION CALIBRATION RIG AND METHOD

(75) Inventors: Steve R Allen; Peter G Allen, both of Reading (GB)

(73) Assignee: GEC Avery Limited (GB)

( * ) Notice: Subject to any disclaimer, the term of this patent is extended or adjusted under 35 U.S.C. 154(b) by 0 days.

(21) Appl. No.: 09/376,838

(22) Filed: Aug. 18, 1999

(30) Foreign Application Priority Data

Aug. 20, 1998 (GB) .................................................. 9818068

(51) Int. Cl.[7] .................................................. G01G 23/01
(52) U.S. Cl. .................................................. 177/50; 73/1.13
(58) Field of Search .................................................. 177/50; 702/101, 702/102; 73/1.13, 1.15

(56) References Cited

U.S. PATENT DOCUMENTS

| | | | | |
|---|---|---|---|---|
| 3,674,097 | * | 7/1972 | Gile | 177/50 |
| 3,899,915 | * | 8/1975 | Williams, Jr. et al. | 177/50 |
| 3,939,332 | * | 2/1976 | Williams, Jr. et al. | 177/50 |
| 4,080,657 | * | 3/1978 | Caldicott et al. | 177/50 |
| 4,580,644 | * | 4/1986 | Nishiyama | 177/50 |
| 4,812,806 | * | 3/1989 | Freeman | 702/101 |
| 4,909,338 | * | 3/1990 | Vitunic et al. | 177/50 |
| 5,309,377 | * | 5/1994 | Beebe | 73/1.13 |
| 5,640,334 | * | 6/1997 | Freeman et al. | 73/1.13 |
| 5,724,267 | * | 3/1998 | Richards | 702/101 |
| 5,780,777 | * | 7/1998 | Selig | 177/50 |
| 5,805,467 | * | 9/1998 | Richards | 702/101 |
| 6,076,391 | * | 6/2000 | Broch | 73/1.15 |

\* cited by examiner

*Primary Examiner*—Randy W. Gibson
(74) *Attorney, Agent, or Firm*—Kirschstein, et al.

(57) ABSTRACT

In a calibration rig for a weighing machine and a method of using the calibration rig, the weighing machine having a load cell including a transducer and headwork connected to the load cell, the calibration rig having a calibration load cell including a low capacity transducer with the excitation voltage and signal connections arranged for connection to the headwork and a potentiometer. The fixed terminations of the potentiometer are connected to respective signal connections and the wiper connection of the potentiometer is connected to one excitation supply terminal via a series resistor.

5 Claims, 2 Drawing Sheets

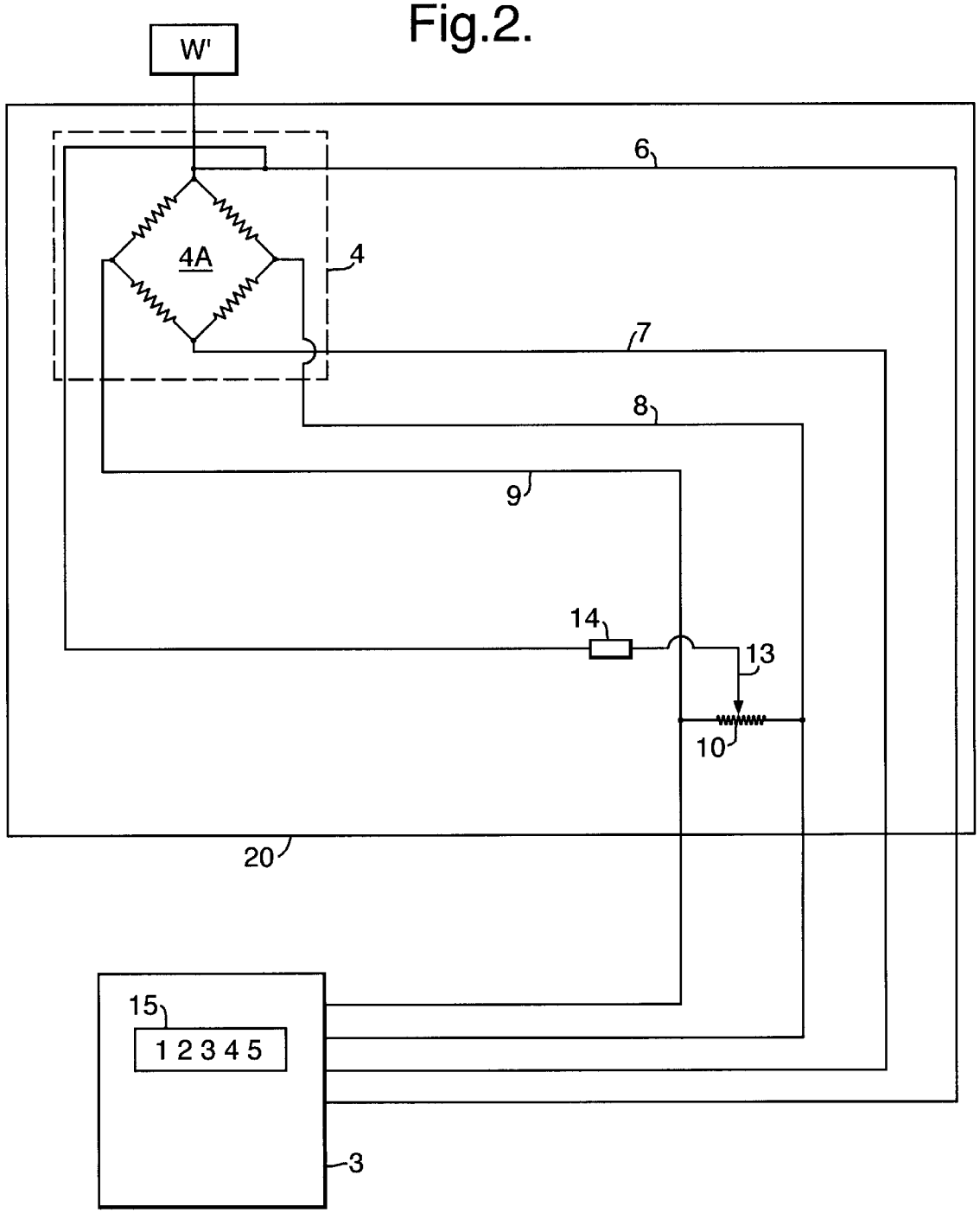

WEIGHT SIMULATION CALIBRATION RIG AND METHOD

BACKGROUND OF THE INVENTION

The aim of the present invention is to provide a simplified means of calibrating the headwork for a weighing machine.

Calibration of weighing machines can be a complex and arduous task, especially where the weighing machine has a high maximum load and calibration involves the placing of weights to give a dead load of up to that maximum load on the weight platform or in the material vessel. This may very often have to be done in conditions of poor accessibility and possible danger.

By eliminating the need to handle weights up to this maximum load and improving accessibility, the present invention eases and simplifies the calibration procedure.

SUMMARY OF THE INVENTION

According to the present invention there is provided a calibration rig for a weighing machine, the weighing machine comprising a load cell including a transducer and headwork connected to the load cell, the calibration rig comprising a load cell including a low capacity transducer having excitation voltage and signal connections arranged for connection to the headwork and a potentiometer, the fixed terminations of the potentiometer being connected to respective signal connections and the wiper connection of the potentiometer being connected to one excitation supply terminal via a series resistor.

There is further provided a method of calibrating a weighing machine using a calibrating rig as above comprising the steps of:
1) Balancing the headwork with the weighing machine connected for normal operation;
2) Applying a known dead weight load and recording the reading on the headwork display;
3) Removing the load from the weighing machine;
4) Disconnecting the headwork from the load cell and connecting the calibration rig to the headwork;
5) Balancing the headwork by means of the potentiometer;
6) Applying weights to the load cell of the calibration rig until a reading close to the previous reading is obtained. The applied weight is the incremental weight and the reading represents the incremental reading;
7) Applying weights to the calibration rig load cell in steps of incremental weight to simulate an increase in readings in steps equal to the incremental reading on the headwork display;
8) Adjusting the headwork to achieve the correct reading;
9) Removing all weights from the calibration rig;
10) Disconnecting the calibration rig and reconnecting the weighing machine load cell to the headwork.

BRIEF DESCRIPTION OF THE DRAWINGS

The present invention will now be described by way of example, with reference to the accompanying drawings, in which;

FIG. 2 shows a view similar to that of FIG. 1, where the load cell has been removed and the calibration rig of the present invention has been connected in its place.

DESCRIPTION OF THE PREFERRED EMBODIMENT

Figure 1:
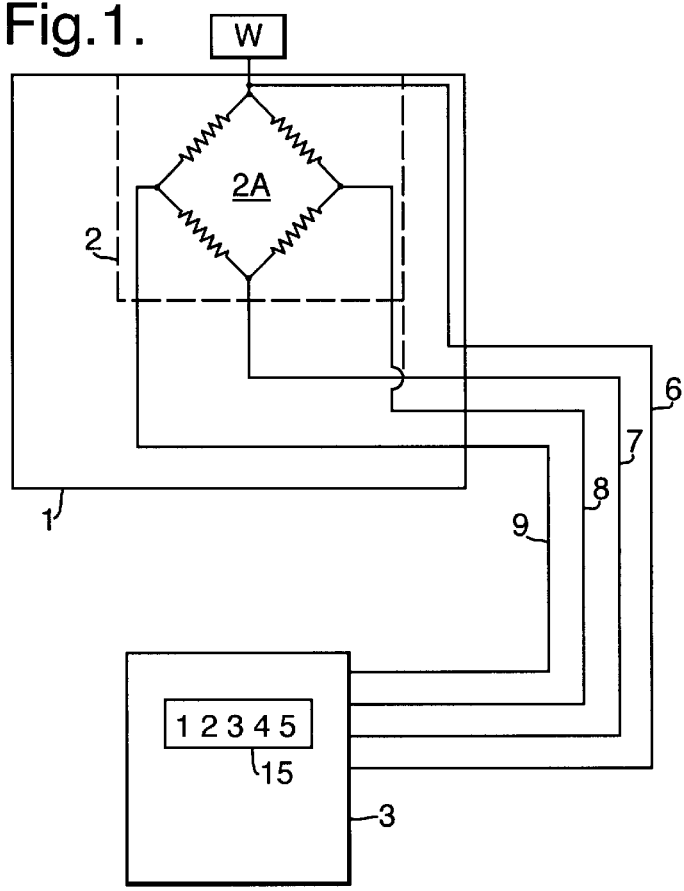
FIG. 1 shows a diagrammatic view of a load cell, including a transducer connected to the headwork, of a typical weighing machine.

A weighing machine 1, as shown in FIG. 1, includes a load cell 2 having a transducer 2A connected to headwork 3. The headwork 3 includes a display 15 giving the load applied to the load cell 2. Between the load cell 2 and the headwork 3 are excitation voltage leads 6, 7 and signal connecting leads 8,9 respectively to and from the transducer 2A.

The calibration rig 20 in FIG. 2 includes a load cell 4 having a low capacity transducer 4A, to which are connected the excitation voltage leads 6,7 and the signal connecting leads 8,9. A potentiometer 10 is connected across the signal connecting leads 8,9 and the wiper connection 13 of the potentiometer 10 is connected via a series resistor 14 to excitation voltage lead 6. To improve the resolution of the calibration rig 20, the potentiometer 10 is preferably a multi-turn potentiometer.

A calibration procedure would then be carried out as follows:
1. Balance the headwork 3 with the weighing machine 1 connected for normal operation.
2. Apply a known dead weight load (W) and record the reading (R) on the headwork display 15, noting any errors.
3. Remove the load from the weighing machine 1.
4. Disconnect the headwork 3 from the load cell 2 and connect the calibration rig 20 to the headwork 3.
5. Balance the headwork 3 by means of the potentiometer 10.
6. Apply weights (Wa) to the load cell 4 of the calibration rig 20 until a reading (Ra) close to the reading (R) is obtained. This reading represents the datum start point.
7. Apply weights to the load cell 4 in increments (Wa) to simulate an increase in readings in steps of (Ra) on the headwork display 15.
8. Adjust the headwork to achieve the correct reading.
9. Remove all weights from the calibration rig.
10. Disconnect the calibration rig 20 and reconnect the load cell 2 to the headwork 3.
11. Apply the known dead weight load (W) to the weighing machine 1 and note the reading, which should be correct. If it is not correct, repeat steps 2–10
12. Disconnect the load cell 1 and reconnect the calibration rig 20.
13. Apply weights (Wa) to the load cell 4 to achieve the datum start reading (R'). Then, as before apply weights in increments of (Wa) to simulate the loads. Check for errors.
14. If readings are correct, disconnect the calibration rig 20 and reconnect the load cell 2 to the headwork 3. The weight (Wa) to be applied to the load cell 4 will normally be given approximately by:

$$Wa = \frac{\text{Maximum load of calibration rig load cell 4}}{\text{Maximum load of weighting machine load cell (or cells) 2}}$$

Ideally the maximum capacity of the calibration rig load cell should be approximately one twentieth or less of the maximum capacity of the weighing machine load cell or cells.

Figure 3:
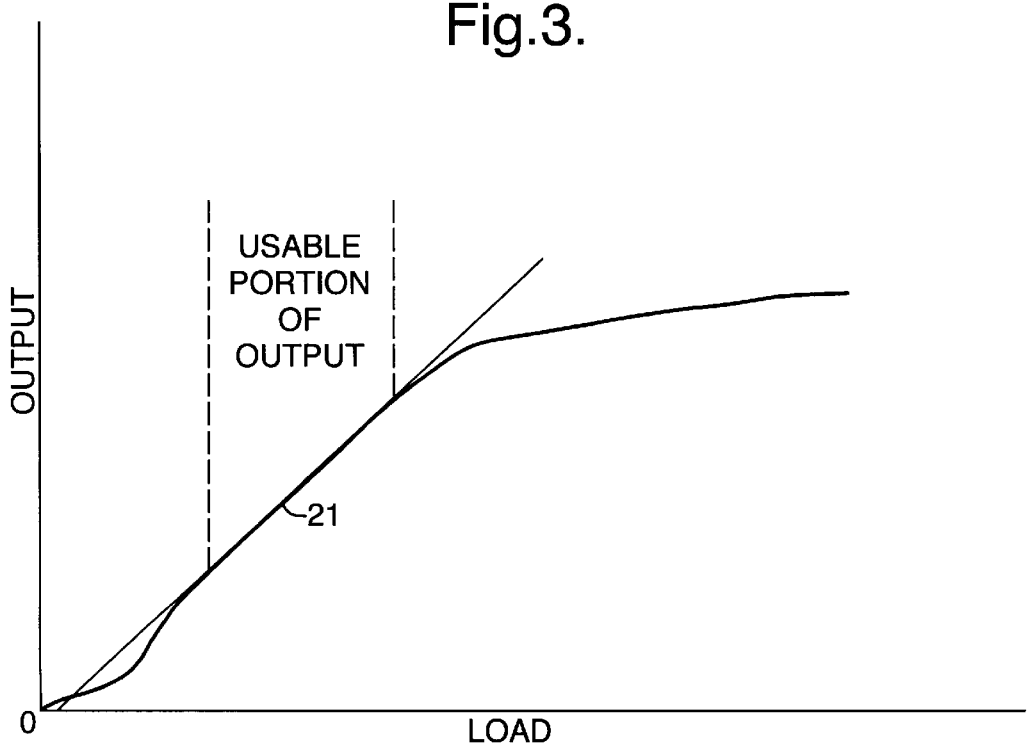
FIG. 3 shows a typical output from a transducer plotted against load.

FIG. 3 shows the typical output curve of a transducer against applied load. It is normal to operate the transducer in the most linear section of the curve, as shown by the line 21.

The application of an offset voltage derived from the potentiometer 10 across the signal leads 8, 9 and connected to the excitation voltage lead 6, provides an offset voltage to the signal voltage from the transducer 4A.

What is claimed is:

1. In a weighing machine having excitation voltage and signal leads connected between a headwork and a machine transducer of a machine load cell during weighing of a load, and disconnected between the headwork and the machine transducer during calibration, a calibration rig for calibrating the weighing machine, comprising:

a) a calibration load cell having a calibration transducer connected to the headwork by the excitation and signal leads during calibration;

b) a resistor; and c) a potentiometer having fixed terminals connected to and across the signal leads, and a movable terminal connected in series with the resistor to one of the excitation voltage leads.

2. The rig of claim 1, wherein the potentiometer has multiple turns of winding.

3. The rig of claim 1, wherein the machine load cell has a maximum load value, and wherein the calibration load cell has a maximum load value which is at least one-twentieth of the maximum load value of the machine load cell.

4. A method of calibrating a weighing machine having excitation voltage and signal leads connected between a headwork and a machine transducer of a machine load cell during weighing of a load, comprising the steps of:

a) disconnecting the excitation voltage and signal leads from the machine transducer;

b) connecting the excitation voltage and signal leads from the headwork to a calibration transducer of a calibration load cell;

c) connecting fixed terminals of a potentiometer to and across the signal leads;

d) connecting a movable terminal of the potentiometer to one of the excitation voltage leads via a series resistor; and e) balancing the headwork by moving the movable terminal.

5. The method of claim 4, wherein the balancing step is performed by applying incremental weights to the calibration load cell.

* * * * *